United States Patent
Gitzel et al.

(10) Patent No.: US 12,044,576 B2
(45) Date of Patent: Jul. 23, 2024

(54) SYSTEM FOR MONITORING A DEVICE

(71) Applicant: ABB Schweiz AG, Baden (CH)

(72) Inventors: Ralf Gitzel, Mannheim (DE); Joerg Gebhardt, Mainz (DE); Joerg Ostrowski, Zürich (CH); Maciej Mruczek, Cracow (PL); Anastasios Papageorgiou, Zürich (CH)

(73) Assignee: ABB Schweiz AG, Baden (CH)

( * ) Notice: Subject to any disclaimer, the term of this patent is extended or adjusted under 35 U.S.C. 154(b) by 197 days.

(21) Appl. No.: 17/721,496

(22) Filed: Apr. 15, 2022

(65) Prior Publication Data

US 2022/0333992 A1 Oct. 20, 2022

(30) Foreign Application Priority Data

Apr. 20, 2021 (EP) .................................... 21169360

(51) Int. Cl.
*G01J 5/00* (2022.01)
*G01J 5/02* (2022.01)
*H04N 5/33* (2023.01)

(52) U.S. Cl.
CPC ............ *G01J 5/0066* (2013.01); *G01J 5/027* (2013.01); *H04N 5/33* (2013.01); *G01J 2005/0077* (2013.01)

(58) Field of Classification Search
CPC .. G01J 5/0066; G01J 5/027; G01J 2005/0077; G01J 5/00; H04N 5/33;

(Continued)

(56) References Cited

U.S. PATENT DOCUMENTS

2021/0071953 A1* 3/2021 Israelsen .................. G08B 7/06

FOREIGN PATENT DOCUMENTS

CA 2260193 A1 1/1998
CN 201041515 Y 3/2008
(Continued)

OTHER PUBLICATIONS

Hoffmann et al., "Integration of Novel Sensors and Machine Learning for Predictive Maintenance in Medium Voltage Switchgear to Enable the Energy and Mobility Revolutions," *Sensors*, 20(7), 2099: 1-24 (Apr. 8, 2020).

(Continued)

*Primary Examiner* — David P Porta
*Assistant Examiner* — Meenakshi S Sahu
(74) *Attorney, Agent, or Firm* — Leydig, Voit & Mayer, Ltd.

(57) ABSTRACT

A system and method includes an infrared camera; a processing unit; and an output unit. The infrared camera is configured to acquire a plurality of infrared images of the device, wherein the plurality of infrared images comprises a first infrared image and a second infrared image acquired a time period after the first infrared image. The processing unit is configured to determine a pixel in the first infrared image with a hottest temperature and determine a pixel in the second infrared image with a hottest temperature. The processing unit is configured to determine a first number of pixels in the first infrared image that have a temperature within a threshold temperature of the hottest temperature of the first infrared image and determine a second number of pixels in the second infrared image that have a temperature within the threshold temperature of the hottest temperature of the second infrared image.

16 Claims, 4 Drawing Sheets

A

B

C

D

F

E (58) Field of Classification Search
CPC . G06T 2207/10048; G06T 2207/20084; G06T 2207/30164; G06T 7/11; G06T 7/136; G06T 7/0004
See application file for complete search history.

(56) References Cited

FOREIGN PATENT DOCUMENTS

| | | |
|---|---|---|
| CN | 201096525 Y | 8/2008 |
| CN | 204270461 U | 4/2015 |
| CN | 205070199 U | 3/2016 |
| CN | 205883160 U | 1/2017 |
| CN | 206835046 U | 1/2018 |
| CN | 107917761 A | 4/2018 |
| CN | 109215042 A | 1/2019 |
| CN | 208672148 U | 3/2019 |
| CN | 208707596 U | 4/2019 |
| CN | 109829417 A | 5/2019 |
| CN | 109993736 A | 7/2019 |
| CN | 209197907 U | 8/2019 |
| CN | 110635768 A | 12/2019 |
| CN | 111080691 A | 4/2020 |
| CN | 210327503 U | 4/2020 |
| CN | 210693862 U | 6/2020 |
| EP | 3716205 A1 | 9/2020 |
| EP | 3786598 A1 | 3/2021 |

OTHER PUBLICATIONS

European Patent Office, Extended European Search Report in European Patent Application No. 21169360.1, 10 pp. (Oct. 18, 2021).

* cited by examiner

SYSTEM FOR MONITORING A DEVICE

CROSS-REFERENCE TO RELATED APPLICATIONS

This patent application claims priority to European Patent Application No. 21169360.1, filed on Apr. 20, 2021, which is incorporated herein by reference.

FIELD OF THE DISCLOSURE

The present disclosure relates to a system for monitoring a device such as a switchgear or motor and to a method for monitoring a device.

BACKGROUND OF THE INVENTION

Infrared (IR) images can be used to identify technical problems within electrical equipment (e.g. switchgear) that leads to overheating of components. However, while a human is quite capable of recognizing hot spots, automated systems require specific configurations to be able properly to recognize the problems. A typical approach is to identify a region of interest for each phase. These regions can then be compared. If one is significantly hotter than the others, a fault has occurred.

There are several drawbacks to this approach. First of all, the phases have to be identified in the IR image manually for each model and rating of switchgear. This is a time consuming, expensive and error-prone process as the exact position of the phases in the IR image depend on many switchgear specific parameters (panel size, current rating, internal structure) as well as camera specific parameters (field of view, resolution, and manufacturing tolerances of optics). Second, any hot activity outside the defined region of interest will be ignored, so any mistakes reduce the efficiency of the algorithm, and any developing problem in a different component will not be detected. Thirdly, a modification of the switchgear during a service task in the field may influence the identification of phases in the IR image, and/or any movement or change in alignment of the camera's field of view leads to a change of the position of the regions and to incorrect operation.

BRIEF SUMMARY OF THE INVENTION

It would be advantageous to have an improved system for processing the IR image of electrical equipment to actionable information.

The present disclosure describes a system and method relating to monitoring a device such as a switchgear, but finds utility in other electrical system than can suffer from components that overheat such as motors. These different apparatuses, system or devices are generically termed as devices in the description that follows.

BRIEF DESCRIPTION OF THE SEVERAL VIEWS OF THE DRAWING(S)

Exemplary embodiments will be described in the following with reference to the following drawings.

DETAILED DESCRIPTION OF THE INVENTION

FIGS. 1-4 relate to a system for monitoring a device and a method for monitoring a device.

In an example, the system for monitoring a device comprises an infrared camera, a processing unit, and an output unit. The processing and output units can be implemented in hardware and/or software without regard to the functions performed. Each unit can be implemented separately or both units can be implemented in a single computer that includes dedicated hardware or shared hardware and/or software with other controllers. The units can be virtual machines operating on a cloud platform. In the disclosed embodiments, the processing and output units are capable and configured to execute computer executable instructions that are stored on tangible media. Each unit may include a processor operably associated with memory that is permanent and/or non-transient, and least temporarily during operation.

In the illustrated embodiment, the infrared camera is configured to acquire a plurality of infrared images of the device. The plurality of infrared images comprises a first infrared image and a second infrared image acquired a time period after the first infrared image. The processing unit is configured to determine a pixel in the first infrared image with a hottest temperature and determine a pixel in the second infrared image with a hottest temperature. The processing unit is configured to determine a first number of pixels in the first infrared image that have a temperature within a threshold temperature of the hottest temperature of the first infrared image and determine a second number of pixels in the second infrared image that have a temperature within the threshold temperature of the hottest temperature of the second infrared image. The processing unit is configured to determine a temperature magnitude comprising utilization of the hottest temperature in the second infrared image and/or a hottest temperature in a different infrared image of the plurality of infrared images acquired at a different time to the second infrared image. The processing unit is configured to determine a rate of change of temperature comprising utilization of the hottest temperature in the second infrared image and the hottest temperature in the different infrared image and a time duration between the acquisition of the second infrared image and the acquisition of the different infrared image. The processing unit is configured to determine that a hot spot exists in the device and/or a hot spot is developing in the device comprising utilization of:
  a comparison between the first number of pixels and the second number of pixels; and
  the temperature magnitude and the rate of change of temperature; and
The output unit is configured to output an indication of a fault in the device on the basis of the determination that a hot spot exists and/or is developing.

In an example, the temperature magnitude is the hottest temperature in the second infrared image.

In an example, the temperature magnitude is the hottest temperature in the different infrared image.

In an example, the temperature magnitude is an average of the hottest temperature in the second infrared image and the hottest temperature in the different infrared image.

According to an example, the different infrared image is the first infrared image.

According to an example, the different infrared image was acquired at a time between the first infrared image and the second infrared image, or the second infrared image was acquired at a time between the first infrared image and the different infrared image.

According to an example, the time period between acquisitions of the first infrared image and the second infrared image is greater than the time duration between acquisitions of the second infrared image and the different infrared image.

According to an example, the threshold temperature is a fixed temperature offset.

According to an example, the comparison between the first number of pixels and the second number of pixels comprises a determination of a pixel count difference equal to the second number of pixels subtracted from the first number of pixels.

According to an example, the determination that the hot spot exists in the device and/or the hot spot is developing in the device comprises a comparison of the pixel count difference with a threshold pixel count number According to an example, the threshold pixel count number is fixed.

According to an example, the threshold pixel could number is a function of the hottest temperature in the first infrared image and/or in the second infrared image.

According to an example, the determination that the hot spot exists in the device and/or the hot spot is developing in the device comprises an analysis of one or more of: a shape of at least one region within the determined pixels in the first infrared image and second infrared image; a size of the at least one region within the determined pixels in the first infrared image and second infrared image; a position of the at least one region within the determined pixels in the first infrared image and second infrared image.

According to an example, the determination that the hot spot exists in the device and/or the hot spot is developing in the device comprises a determination that a region in the second infrared image is smaller than a corresponding region in the first infrared image.

According to an example, the determination that the hot spot exists in the device and/or the hot spot is developing in the device comprises a determination that a number of regions in the second infrared image is smaller than a number of regions in the first infrared image.

In an example, the determination that the hot spot exists in the device and/or the hot spot is developing in the device comprises a determination that the number of regions in the second image is one.

In an example, the device comprises two or more components of the same type that are loaded with substantially the same current; wherein the determination that the hot spot exists in the device and/or the hot spot is developing in the device comprises one or more of: a shape of a first region within the determined pixels in the second infrared image is different to a shape of a second region within the determined pixels in second infrared image; a size of a first region within the determined pixels in the second infrared image is different to a size of a second region within the determined pixels in the second infrared image; a position of a region within the determined pixels in the second infrared image is not associated with a position of the two or more components; a number of regions within the determined pixels in the second infrared image is less than a number of the two or more components.

In an example, the determination that the hot spot exists in the device and/or the hot spot is developing in the device comprises a determination that there is only one region within the determined pixels in the second infrared image.

In an example, the determination that the hot spot exists in the device and/or the hot spot is developing in the device comprises a generation of at least one binary image, wherein the determined pixels in the first and second infrared images are given a different binary value to the remaining pixels in the at least one infrared image.

According to an example, the determination that the hot spot exists in the device and/or the hot spot is developing in the device comprises utilization of a machine learning algorithm In an example, the machine learning algorithm is a trained neural network.

According to an example, the plurality of infrared images were acquired at different times. The processing unit is configured to determine a pixel in each of the plurality of infrared images associated with a hottest temperature in each of the plurality of infrared images. The processing unit is configured to determine a number of threshold pixels in each of the plurality of infrared images associated with a temperature that is within the threshold temperature of the hottest temperature in each of the plurality of infrared images. The determination that the hot spot exists in the device and/or the hot spot is developing in the device comprises a determination of a rate of change of the number of threshold pixels with time.

In an example, the determination that the hot spot exists in the device and/or the hot spot is developing in the device comprises a comparison of the rate of change of the number of threshold pixels with time against a baseline rate of change of the number of threshold pixels with time.

In an example, the device comprises at least a part of a medium voltage switchgear or comprises a motor.

In an example, the processing unit is configured to predict a temperature at a location of the device associated with the pixel in the second infrared image with the hottest temperature comprising utilization of the temperature magnitude and the rate of change of temperature and a correlation. The correlation is a correlation of a plurality of temperature magnitudes and a plurality of rate of change of temperatures with a plurality of hotspot temperatures. The determination that the hot spot exists in the device and/or the hot spot is developing in the device comprises utilization of the predicted temperature.

In an example, the determination that the hot spot exists in the device and/or the hot spot is developing in the device comprises a determination that the predicted temperature exceeds a threshold temperature.

In an example, the processing unit is configured to select the correlation from a plurality of correlations of different operational scenarios for the device. Each of the plurality of correlations is a correlation of a plurality of temperature magnitudes and a plurality of rate of change of temperatures at the sensor location with a plurality of hotspot temperatures at the location.

In an example, each of the plurality of correlations is determined through experiments or through simulations.

In an example, a method for monitoring a device comprises:

acquiring by an infrared camera a plurality of infrared images of the device, wherein the plurality of infrared images comprises a first infrared image and a second infrared image acquired a time period after the first infrared image;

determining by a processing unit a pixel in the first infrared image with a hottest temperature and determining a pixel in the second infrared image with a hottest temperature;

determining by the processing unit a first number of pixels in the first infrared image that have a temperature within a threshold temperature of the hottest temperature of the first infrared image and determining a second number of pixels in the second infrared image that have a temperature within the threshold temperature of the hottest temperature of the second infrared image;

determining by the processing unit a temperature magnitude comprising utilization of the hottest temperature in the second infrared image and/or a hottest temperature in a different infrared image of the plurality of infrared images acquired at a different time to the second infrared image;

determining by the processing a rate of change of temperature comprising utilization of the hottest temperature in the second infrared image and the hottest temperature in the different infrared image and a time duration between the acquisition of the second infrared image and the acquisition of the different infrared image;

determining by the processing unit that a hot spot exists in the device and/or a hot spot is developing in the device comprising utilizing:

a comparison between the first number of pixels and the second number of pixels; and the temperature magnitude and the rate of change of temperature; and outputting by an output unit an indication of a fault in the device on the basis of the determination that a hot spot exists and/or is developing.

In an example, the temperature magnitude is the hottest temperature in the second infrared image.

In an example, the temperature magnitude is the hottest temperature in the different infrared image.

In an example, the temperature magnitude is an average of the hottest temperature in the second infrared image and the hottest temperature in the different infrared image.

In an example, the different infrared image is the first infrared image.

In an example, the different infrared image is not the first image and the different infrared image was acquired at a time between the first infrared image and the second infrared image, or the second infrared image was acquired at a time between the first infrared image and the different infrared image.

In an example, the time period between acquisitions of the first infrared image and the second infrared image is greater than the time duration between acquisitions of the second infrared image and the different infrared image.

In an example, the threshold temperature is a fixed temperature offset.

In an example, the comparison between the first number of pixels and the second number of pixels comprises a determination of a pixel count difference equal to the second number of pixels subtracted from the first number of pixels.

In an example, the determination that the hot spot exists in the device and/or the hot spot is developing in the device comprises a comparison of the pixel count difference with a threshold pixel count number.

In an example, the threshold pixel count number is fixed.

In an example, the threshold pixel could number is a function of the hottest temperature in the first infrared image and/or in the second infrared image.

In an example, the determining that the hot spot exists in the device and/or the hot spot is developing in the device comprises an analysis of one or more of: a shape of at least one region within the determined pixels in the first infrared image and second infrared image; a size of the at least one region within the determined pixels in the first infrared image and second infrared image; a position of the at least one region within the determined pixels in the first infrared image and second infrared image.

In an example, the determining that the hot spot exists in the device and/or the hot spot is developing in the device comprises a determination that a region in the second infrared image is smaller than a corresponding region in the first infrared image.

In an example, the determining that the hot spot exists in the device and/or the hot spot is developing in the device comprises a determination that a number of regions in the second infrared image is smaller than a number of regions in the first infrared image.

In an example, the determination that the hot spot exists in the device and/or the hot spot is developing in the device comprises a determination that the number of regions in the second image is one.

In an example, the device comprises two or more components of the same type that are loaded with substantially the same current; wherein the determination that the hot spot exists in the device and/or the hot spot is developing in the device comprises one or more of: a shape of a first region within the determined pixels in the second infrared image is different to a shape of a second region within the determined pixels in second infrared image; a size of a first region within the determined pixels in the second infrared image is different to a size of a second region within the determined pixels in the second infrared image; a position of a region within the determined pixels in the second infrared image is not associated with a position of the two or more components; a number of regions within the determined pixels in the second infrared image is less than a number of the two or more components.

In an example, the determining that the hot spot exists in the device and/or the hot spot is developing in the device comprises a determination that there is only one region within the determined pixels in the second infrared image.

In an example, the determining that the hot spot exists in the device and/or the hot spot is developing in the device comprises a generation of at least one binary image, wherein the determined pixels in the first and second infrared images are given a different binary value to the remaining pixels in the at least one infrared image.

In an example, the determining that the hot spot exists in the device and/or the hot spot is developing in the device comprises utilization of a machine learning algorithm In an example, the machine learning algorithm is a trained neural network.

In an example, the plurality of infrared images were acquired at different times, and wherein the method comprises determining by the processing unit a pixel in each of the plurality of infrared images associated with a hottest temperature in each of the plurality of infrared images, and determining by the processing unit a number of threshold pixels in each of the plurality of infrared images associated with a temperature that is within the threshold temperature of the hottest temperature in each of the plurality of infrared images, and the determining that the hot spot exists in the device and/or the hot spot is developing in the device comprises determining a rate of change of the number of threshold pixels with time.

In an example, the determining that the hot spot exists in the device and/or the hot spot is developing in the device comprises comparing the rate of change of the number of threshold pixels with time against a baseline rate of change of the number of threshold pixels with time.

In an example, the device comprises at least a part of a medium voltage switchgear or comprises a motor.

In an example, the method comprises predicting by the processing unit a temperature at a location of the device associated with the pixel in the second infrared image with the hottest temperature comprising utilizing the temperature magnitude and the rate of change of temperature and a correlation, where the correlation is a correlation of a plurality of temperature magnitudes and a plurality of rate of change of temperatures with a plurality of hotspot temperatures, and where the determining that the hot spot exists in the device and/or the hot spot is developing in the device comprises utilizing the predicted temperature.

In an example, the determining that the hot spot exists in the device and/or the hot spot is developing in the device comprises a determination that the predicted temperature exceeds a threshold temperature.

In an example, the method comprises selecting by the processing unit the correlation from a plurality of correlations of different operational scenarios for the device, where each of the plurality of correlations is a correlation of a plurality of temperature magnitudes and a plurality of rate of change of temperatures with a plurality of hotspot temperatures.

In an example, each of the plurality of correlations is determined through experiments or through simulations.

Continuing with the figures, the system and method for monitoring a device such as a switchgear or motor is described in further detail, with respect to specific embodiments, where reference is made to monitoring a switchgear.

Figure 1:
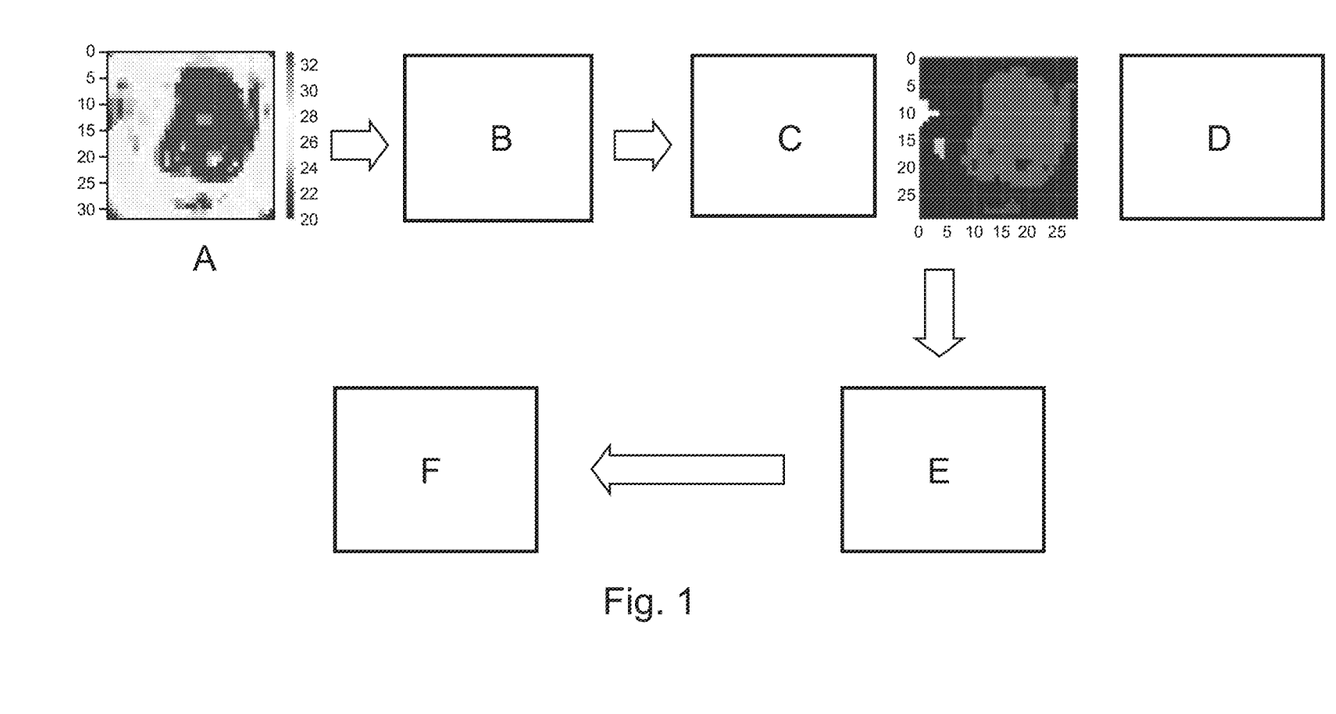
FIG. 1 shows a detailed workflow relating to an example of the processing undertaken to determine a fault in a device such as a switchgear in accordance with the disclosure.

FIG. 1 shows a detailed workflow relating to an example of the processing undertaken to determine a fault in a switchgear. As shown at "A" an IR image of a switchgear is acquired by an infrared camera. A pre-processing step can be used to increase the image quality. This can involve noise suppression, compensation of optical effects, removal of edges, etc. At "B" the hottest temperature point within the image is acquired or identified, for example 35° C. There could be several pixels that have exactly the same highest temperature and either or both can be selected. Then at "C" all the pixels in the image that are within a threshold temperature range of the highest temperature are selected. For example, if the threshold temperature range is 7° C., then all pixels between 28° C. and 35° C. are selected. Thus, the threshold value is used to compute a range of values which are considered hot in this particular case. The threshold is the maximum temperature minus a specific value. This value can be a fixed number of degrees Celsius or a percentage of the current average temperature of the image, or a percentage of the maximum temperature of the image or a dynamically changing value in degrees Celsius depending on the average or maximum temperature of the image. Thus, the threshold can account for the influence of the ambient air temperature (inside the compartment and/or outside of the switchgear) as well as take into account any influence of compartment type. The result is shown in the following image. Optionally, at "D" regions that are connected are identified. At "E" the pixel count, number of regions, shape, and/or size of individual regions is analyzed to decide whether this is a fault or not. If a fault is determined at "F" the pixel map is overlaid on a visual light image of the switchgear, for example of the switchgear compartment, to identify the position of the fault and/or to define which regions belong to which phase of a three-phase system.

Thus, the threshold is used to identify all camera pixels which are hotter than the threshold value. Images with a very strong hotspot will exhibit rather a small area. If there is no hotspot, the area is wide or broad, and in ideal cases even showing the different components of interest as distinct unconnected regions.

The original IR image can be transformed to a new, binary image, consisting of only two colors (for example black and white), where one color (e.g. black) are the pixels above the threshold (the hot pixels) and other color (e.g. white) are the pixels below the threshold (the cold pixels)—this is just an example, where of the course the pixels can be the other way round, i.e. white is "hot" and black is "cold". In general, this transformation can result in a mask for further processing of the IR image, for example by a machine learning algorithm such as a trained neural network.

Thus, an algorithm applies a dynamic threshold to the image and returns only the pixels that are in the region of highest temperature. If the image shows a healthy device, this algorithm will separate the background (low temperature) from the foreground (high temperature). Thus it can be determined if a hot spot is developing because the number of pixels within a threshold of a maximum temperature starts to fall. Thus, a fault in an isolated device that is leading to a hot spot can be identified. Also, with respect to for example a three phase switchgear then parts of each phase typically exhibit equivalent current flow and due to Joule heating heat up to equivalent temperatures. Thus, the temperature difference between equivalent elements of the phases will be less than the threshold temperature range and thus all phases will be shown and the number of pixels stays relatively stable. It is then further established that there is a fault as the part with a fault remains at the highest temperature, but other parts of that phase and of the other phases start to disappear from within the temperature threshold range.

Figure 3:
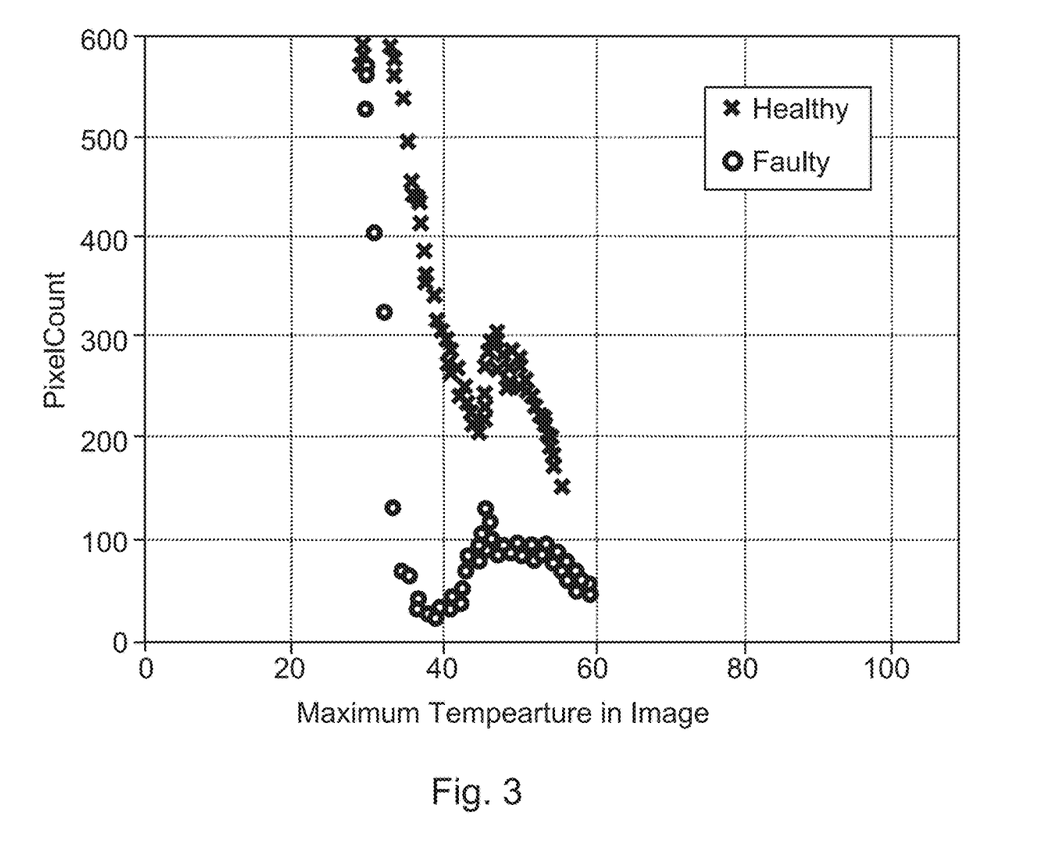
FIG. 3 shows the change in the number of pixels in an image within a threshold of the maximum temperature for examples of normal (healthy) and faulty situations in accordance with the disclosure.

Thus, the approach is to count the number of hot pixels, which is shown in FIG. 3. As shown cases with a strong fault will show a sharp decline in the number of hot pixels as the temperature increases in time. The number of pixels used for determining a hot spot situation can be derived for each scene by counting the pixels belonging to one component of interest. If the number of hot pixels drops below this value, the image is showing a hot spot. The number of pixels used for determining a hot spot situation can be also determined by experiments or simulations or via machine learning algorithms. Thus, the number of pixels of a hot region, compared to a baseline for a component can be used to indicate if there is a fault, and also the temporal change in the number of pixels within the threshold region can also be used, when compared against such a baseline, to indicate that the component is abnormally hot and that there is a fault.

Figure 2:
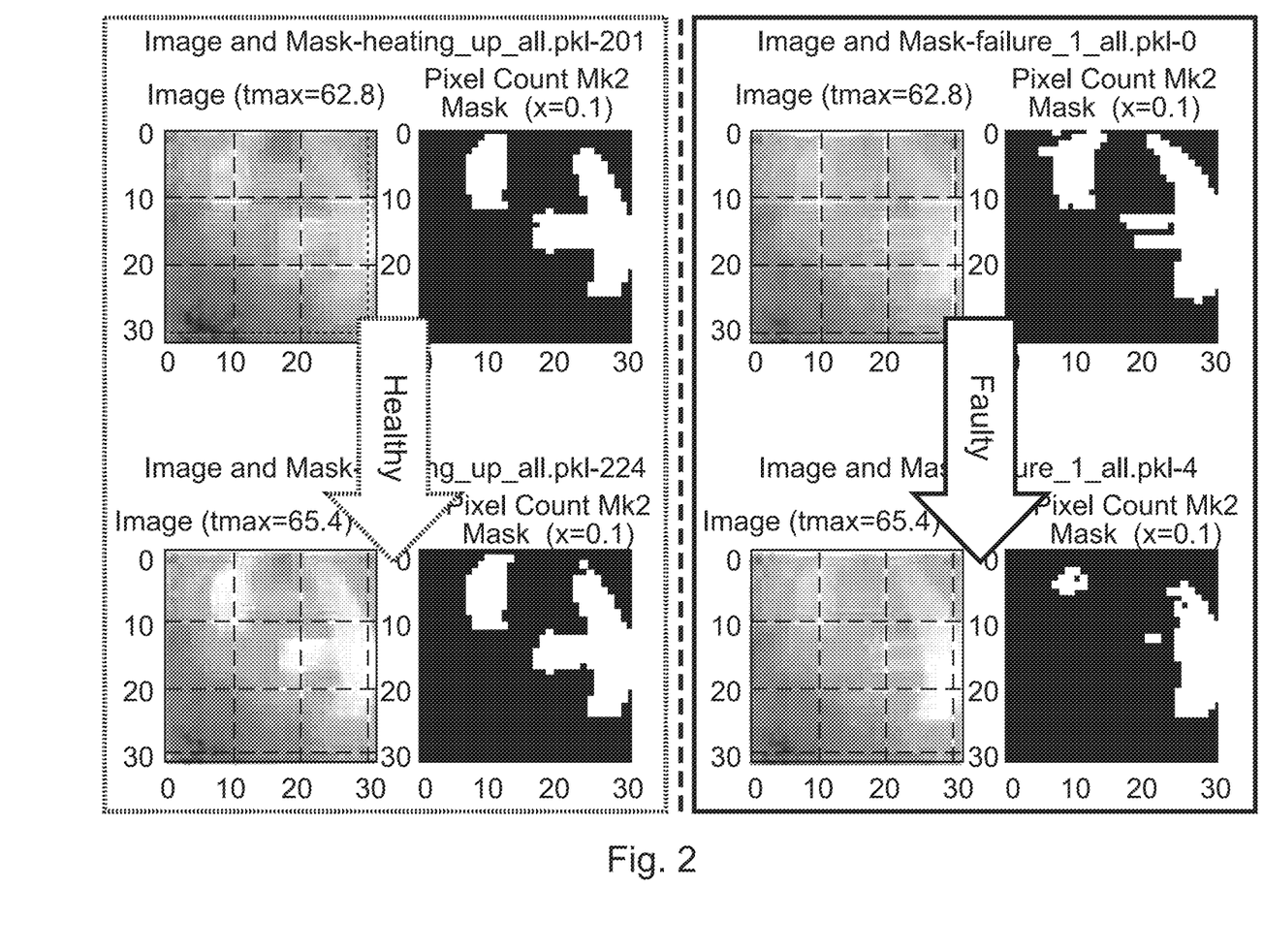
FIG. 2 shows the number of pixels in an image for examples of normal (healthy) and faulty situations in accordance with the disclosure.

To catch more subtle faults, additional properties can be examined. For example, by taking the numbers and respective sizes of distinct regions, it is possible to detect even less obvious hot spots. This is shown in FIG. 2, where in the fault case the shape of pixels regions within the threshold change shape.

The image (for example a transformed binary image) can be further processed by machine learning. The machine learning model can be trained with typical patterns showing layout of hot pixels for images without hot spot, layout of hot pixels for images with a hot spot on a first specific component layout of hot pixels for images with a hot spot on a second component and so forth. The image can be fed to the model and the model will classify it as "no hot spot", "hot spot on the first component or the second component for example. The training data can be easily created for each new scene. A subject matter expert can recognize components on the IR or visual camera image and create typical patterns of black and white images that would be expected for healthy images, and images where different components have faults. The training data can be created from the office, without the need of expensive and time consuming experiments or simulations. The IR image discussed above can be composed of several individual images or sections of individual images, e.g. from different cameras in one panel or line-up or from different time steps.

It has been determined that the maximum temperature and its rate of change of temperature provides further information that improves the accuracy of a fault determination based on the number of pixels within a threshold of the maximum temperature.

It has been established that a determined value of T and dT/dt provides a value that can be correlated to a steady state temperature that will develop if nothing changes.

It has been established that the maximum temperature derivative when combined with the maximum temperature results in two distinct clusters for healthy and faulty data.

Figure 4:
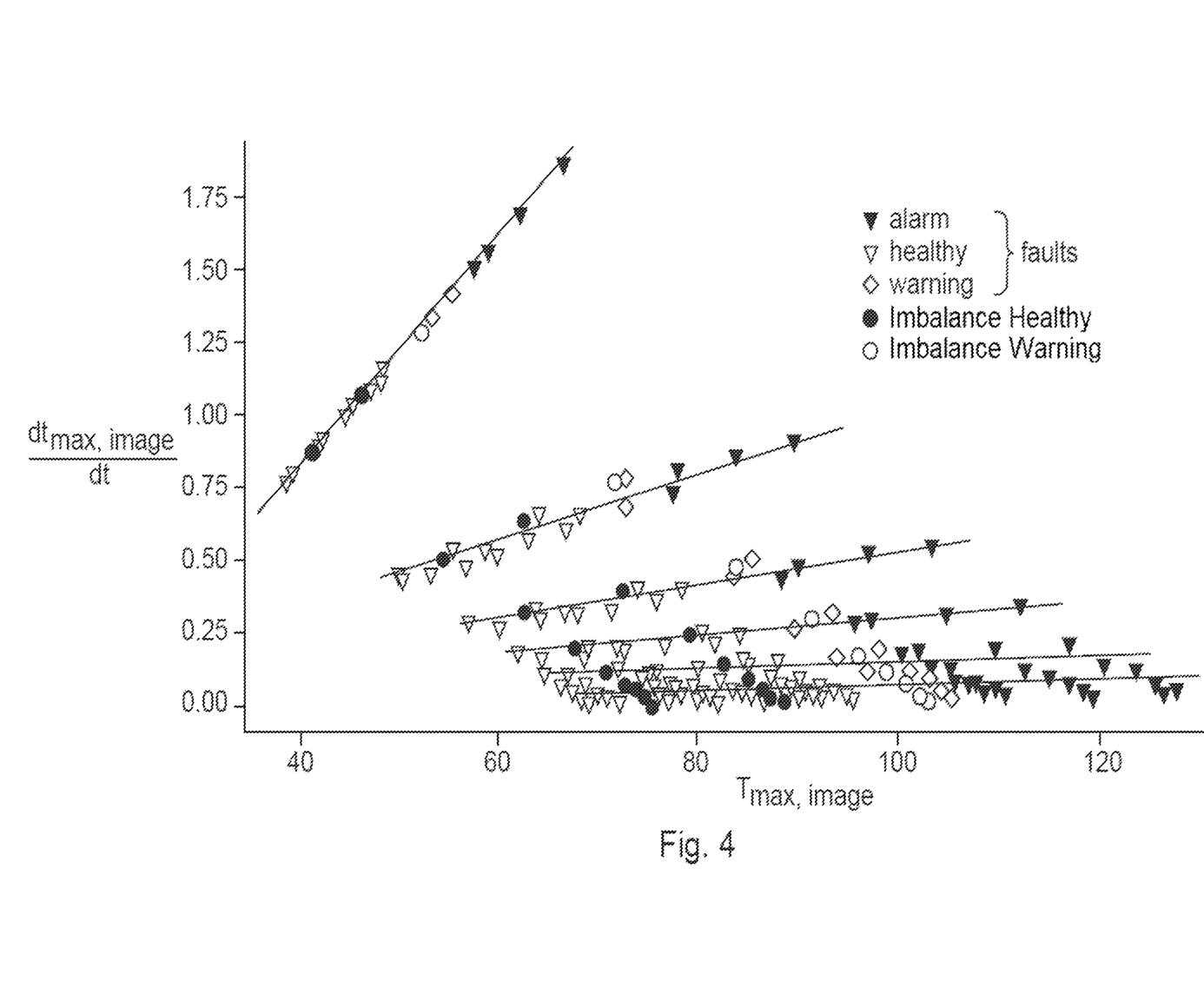
FIG. 4 shows a representation of a series of maximum temperature versus for different operational scenarios for normal (healthy) and faulty situations in accordance with the disclosure.

This is shown in FIG. 4 that plots the two features T and dT/dt for the hottest pixel only. In a particular scenario if a temperature of 45° C. is determined with a rate of change of temperature of 1.1 then it has been determined that under steady state conditions, with nothing else happening, the temperature will not develop into a critical temperature. However, if a temperature of 65° C. has been measure with a rate of change of temperature of 1.75, even though the temperature at the moment is not critical, it has been established that under steady state conditions with no change, the temperature at this location will develop into a critical temperature and remedial action should be taken before that critical temperature develops. The different lines are shown in FIG. 4 to enable the different correlations for different scenarios to be viewed more easily. Thus in FIG. 4 for each correlation centered around a line the temperature and its rise rate in the hottest pixel of the IR camera is shown, where different lines represent several scenarios. For each scenario at the lower temperature range a developed temperature of a hotspot T_HS will be uncritical. However, at the higher temperature range for each correlation the hotspot temperature T_HS will develop to a temperature above threshold and overheating will occur, and mitigating actions need to be taken to stop this happening.

Thus, when this information is combined with the number of pixels within a threshold of the maximum temperature this in effect produces three dimensional information and provides even more cluster distinction.

Typically, it is possible to define a threshold between the healthy and the faulty region by considering a constant value of a pixel number within the threshold temperature. If the number of pixels is below that value, a fault can be determined to have occurred. On the other hand, if this line is a function of the maximum temperature in the image, a more flexible border appears and problems can be recognized at earlier stages. The exact position of the line can be determined by a Support Vector Machine (SVM) or similar algorithm. Alternatives to SVM are other machine learning classification or clustering algorithms.

Thus, a support vector machine or similar ML algorithm can be trained to specify whether a device is healthy or faulty by using the maximum temperature with the number of pixels within a threshold range of the maximum temperature and the temperature derivative as features.

In an aspect, there is provided system for monitoring a device, the system comprising:
an infrared camera;
a processing unit; and
an output unit;

The infrared camera is configured to acquire a plurality of infrared images of the device, wherein the plurality of infrared images comprises a first infrared image and a second infrared image acquired a time period after the first infrared image. The processing unit is configured to determine a pixel in the first infrared image with a hottest temperature and determine a pixel in the second infrared image with a hottest temperature. The processing unit is configured to determine a first number of pixels in the first infrared image that have a temperature within a threshold temperature of the hottest temperature of the first infrared image and determine a second number of pixels in the second infrared image that have a temperature within the threshold temperature of the hottest temperature of the second infrared image. The processing unit is configured to determine a temperature magnitude comprising utilization of the hottest temperature in the second infrared image and/or a hottest temperature in a different infrared image of the plurality of infrared images acquired at a different time to the second infrared image. The processing unit is configured to determine a rate of change of temperature comprising utilization of the hottest temperature in the second infrared image and the hottest temperature in the different infrared image and a time duration between the acquisition of the second infrared image and the acquisition of the different infrared image. The processing unit is configured to determine that a hot spot exists in the device and/or a hot spot is developing in the device comprising utilization of a comparison between the first number of pixels and the second number of pixels and utilization of the temperature magnitude and the rate of change of temperature. The output unit is configured to output an indication of a fault in the device on the basis of the determination that a hot spot exists and/or is developing.

Thus, if a hot spot is developing then a hottest region of the device starts to become hotter than expected. As the hot spot develops it becomes hotter than other regions of the device and the number of pixels within a temperature range of the hottest pixel actual decreases. At the same time on the basis of the temperature of the hottest pixel and a rate of change of temperature it has been established that it can be determined that a hot spot is developing. In this way the reduction in the number of pixels associated with a rate of change of temperature for a maximum temperature that is significantly high enough it can be determined with a high confidence that a hot spot is developing and remedial action, such as turning off the device or reducing power can be done prior to the hot spot causing damage to the device.

In this manner, the change in pixel numbers can be continually calculated with respect to two temporally adjacent infrared images and those images also used to determine a maximum temperature and rate of change of temperature and all of this information used to determine if there is a hot spot. However, in order that the difference in pixel number is maximized an initial infrared image can be acquired and the number of pixels calculated and this can be compared to the number of pixels in a series of infrared images that are then acquired. However, for that series of later infrared images, temporally adjacent images can be used to determine both a maximum temperature and a rate of temperature which when used with the developing change in pixel number enables a hot spot to be identified as developing.

In an example, the different infrared image is the first infrared image.

In an example, the different infrared image is not the first infrared, and the different infrared image was acquired at a time between the first infrared image and the second infrared image, or the second infrared image was acquired at a time between the first infrared image and the different infrared image.

In an example, the time period between acquisitions of the first infrared image and the second infrared image is greater than the time duration between acquisitions of the second infrared image and the different infrared image.

In an example, the threshold temperature is a fixed temperature offset.

In an example, the comparison between the first number of pixels and the second number of pixels comprises a determination of a pixel count difference equal to the second number of pixels subtracted from the first number of pixels.

In an example, the determination that the hot spot exists in the device and/or the hot spot is developing in the device comprises a comparison of the pixel count difference with a threshold pixel count number.

In an example, the threshold pixel count number is fixed.

In an example, the threshold pixel could number is a function of the hottest temperature in the first infrared image and/or in the second infrared image.

In an example, the determination that the hot spot exists in the device and/or the hot spot is developing in the device comprises an analysis of one or more of: a shape of at least one region within the determined pixels in the first infrared image and second infrared image; a size of the at least one region within the determined pixels in the first infrared image and second infrared image; a position of the at least one region within the determined pixels in the first infrared image and second infrared image.

In an example, the determination that the hot spot exists in the device and/or the hot spot is developing in the device comprises a determination that a region in the second infrared image is smaller than a corresponding region in the first infrared image.

In other words, for the example of a switchgear with for example three current carry components, such as the same type of circuit breakers, that should equally be hot, then normally there should be three separate hot regions within the threshold temperature range of the hottest pixel. However, when one of these components develops a fault and becomes hot, then when the threshold temperature range is correctly selected then the maximum temperatures of the other components sit outside of the maximum temperatures (within the temperature range of the hottest temperature) of the faulty component. A consequence is that there is only one region of temperature within the hottest temperatures, rather than three in this example, and this can be used to determine that the component that has this hottest temperature has a fault.

In an example, the determination that the hot spot exists in the device and/or the hot spot is developing in the device comprises a determination that a number of regions in the second infrared image is smaller than a number of regions in the first infrared image.

In an example, the determination that the hot spot exists in the device and/or the hot spot is developing in the device comprises utilization of a machine learning algorithm.

In an example, the plurality of infrared images were acquired at different times, wherein the processing unit is configured to determine a pixel in each of the plurality of infrared images associated with a hottest temperature in each of the plurality of infrared images, wherein the processing unit is configured to determine a number of threshold pixels in each of the plurality of infrared images associated with a temperature that is within the threshold temperature of the hottest temperature in each of the plurality of infrared images, and wherein the determination that the hot spot exists in the device and/or the hot spot is developing in the device comprises a determination of a rate of change of the number of threshold pixels with time.

In a second aspect, there is provided a method for monitoring a device, the method comprising:
  acquiring by an infrared camera a plurality of infrared images of the device, wherein the plurality of infrared images comprises a first infrared image and a second infrared image acquired a time period after the first infrared image;
  determining by a processing unit a pixel in the first infrared image with a hottest temperature and determining a pixel in the second infrared image with a hottest temperature;
  determining by the processing unit a first number of pixels in the first infrared image that have a temperature within a threshold temperature of the hottest temperature of the first infrared image and determining a second number of pixels in the second infrared image that have a temperature within the threshold temperature of the hottest temperature of the second infrared image;
  determining by the processing unit a temperature magnitude comprising utilization of the hottest temperature in the second infrared image and/or a hottest temperature in a different infrared image of the plurality of infrared images acquired at a different time to the second infrared image;
  determining by the processing a rate of change of temperature comprising utilization of the hottest temperature in the second infrared image and the hottest temperature in the different infrared image and a time duration between the acquisition of the second infrared image and the acquisition of the different infrared image;
  determining by the processing unit that a hot spot exists in the device and/or a hot spot is developing in the device comprising utilizing: comparison between the first number of pixels and the second number of pixels; and the temperature magnitude and the rate of change of temperature; and wherein the output unit is configured to output an indication of a fault in the device on the basis of the determination that a hot spot exists and/or is developing.

The above aspects and examples will become apparent from and be elucidated with reference to the embodiments described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for monitoring a device, the system comprising:
    an infrared camera configured to acquire a plurality of infrared images of the device, wherein the plurality of infrared images comprises a first infrared image and a second infrared image acquired a time period after the first infrared image;
    one or more processors; and
    a non-transitory computer-readable medium having processor-executable instructions stored thereon, wherein the processor-executable instructions, when executed by the one or more processors, facilitate:
    determining a pixel in the first infrared image with a hottest temperature and determine a pixel in the second infrared image with a hottest temperature;
    determining a first number of pixels in the first infrared image that have a temperature within a threshold temperature of the hottest temperature of the first infrared image and determine a second number of pixels in the second infrared image that have a temperature within the threshold temperature of the hottest temperature of the second infrared image;
    determining a temperature magnitude comprising utilization of the hottest temperature in the second infrared image and/or a hottest temperature in a different infrared image of the plurality of infrared images acquired at a different time to the second infrared image;
    determining a rate of change of temperature comprising utilization of the hottest temperature in the second infrared image and the hottest temperature in the different infrared image and a time duration between the acquisition of the second infrared image and the acquisition of the different infrared image;
    determining that a hot spot exists in the device and/or a hot spot is developing in the device comprising utilization of a comparison between the first number of pixels and the second number of pixels and the temperature magnitude and the rate of change of temperature; and
    outputting an indication of a fault in the device on the basis of the determination that a hot spot exists and/or is developing.

2. The system according to claim 1, wherein the different infrared image is the first infrared image.

3. The system according to claim 1, wherein the different infrared image was acquired at a time between the first infrared image and the second infrared image, or the second infrared image was acquired at a time between the first infrared image and the different infrared image.

4. The system according to claim 3, wherein the time period between acquisitions of the first infrared image and the second infrared image is greater than the time duration between acquisitions of the second infrared image and the different infrared image.

5. The system according to claim 1, wherein the threshold temperature is a fixed temperature offset.

6. The system according to claim 1, wherein the comparison between the first number of pixels and the second number of pixels comprises a determination of a pixel count difference equal to the second number of pixels subtracted from the first number of pixels.

7. The system according to claim 6, wherein the determination that the hot spot exists in the device and/or the hot spot is developing in the device comprises a comparison of the pixel count difference with a threshold pixel count number.

8. The system according to claim 7, wherein the threshold pixel count number is fixed.

9. The system according to claim 7, wherein the threshold pixel count number is a function of the hottest temperature in the first infrared image and/or in the second infrared image.

10. The system according to claim 1, wherein the determination that the hot spot exists in the device and/or the hot spot is developing in the device comprises an analysis of one or more of: a shape of at least one region within the determined pixels in the first infrared image and second infrared image; a size of the at least one region within the determined pixels in the first infrared image and second infrared image; a position of the at least one region within the determined pixels in the first infrared image and second infrared image.

11. The system according to claim 10, wherein the determination that the hot spot exists in the device and/or the hot spot is developing in the device comprises a determination that a region in the second infrared image is smaller than a corresponding region in the first infrared image.

12. The system according to claim 10, wherein the determination that the hot spot exists in the device and/or the hot spot is developing in the device comprises a determination that a number of regions in the second infrared image is smaller than a number of regions in the first infrared image.

13. The system according to claim 1, wherein the determination that the hot spot exists in the device and/or the hot spot is developing in the device comprises utilization of a machine learning algorithm.

14. The system according to claim 1, wherein the plurality of infrared images is acquired at different times, wherein the processor-executable instructions, when executed by the one or more processors, further facilitate:
   determining a pixel in each of the plurality of infrared images associated with a hottest temperature in each of the plurality of infrared images; and
   determining a number of threshold pixels in each of the plurality of infrared images associated with a temperature that is within the threshold temperature of the hottest temperature in each of the plurality of infrared images, and wherein the determination that the hot spot exists in the device and/or the hot spot is developing in the device comprises a determination of a rate of change of the number of threshold pixels with time.

15. A method for monitoring a device, the method comprising:
   acquiring by an infrared camera a plurality of infrared images of the device, wherein the plurality of infrared images comprises a first infrared image and a second infrared image acquired a time period after the first infrared image;
   determining a pixel in the first infrared image with a hottest temperature and determining a pixel in the second infrared image with a hottest temperature;
   determining a first number of pixels in the first infrared image that have a temperature within a threshold temperature of the hottest temperature of the first infrared image and determining a second number of pixels in the second infrared image that have a temperature within the threshold temperature of the hottest temperature of the second infrared image;
   determining a temperature magnitude comprising utilization of the hottest temperature in the second infrared image and/or a hottest temperature in a different infrared image of the plurality of infrared images acquired at a different time to the second infrared image;
   determining a rate of change of temperature comprising utilization of the hottest temperature in the second infrared image and the hottest temperature in the different infrared image and a time duration between the acquisition of the second infrared image and the acquisition of the different infrared image;
   determining that a hot spot exists in the device and/or a hot spot is developing in the device comprising utilizing:
      a comparison between the first number of pixels and the second number of pixels; and
      the temperature magnitude and the rate of change of temperature; and
   outputting an indication of a fault in the device on the basis of the determination that a hot spot exists and/or is developing.

16. The system according to claim 1, wherein determining that the hot spot exists in the device and/or the hot spot is developing in the device comprises:
   determining a correlational relationship based on comparing the temperature magnitude with the rate of change of temperature; and
   determining that the hot spot exists in the device and/or the hot spot is developing in the device based on the first number of pixels, the second number of pixels, and the correlational relationship.

\* \* \* \* \*